Aug. 23, 1960     R. F. ADAMS     2,949,875
APPARATUS FOR FORMING HOLLOW SHEET METAL PANELS
Filed July 22, 1954     2 Sheets-Sheet 1
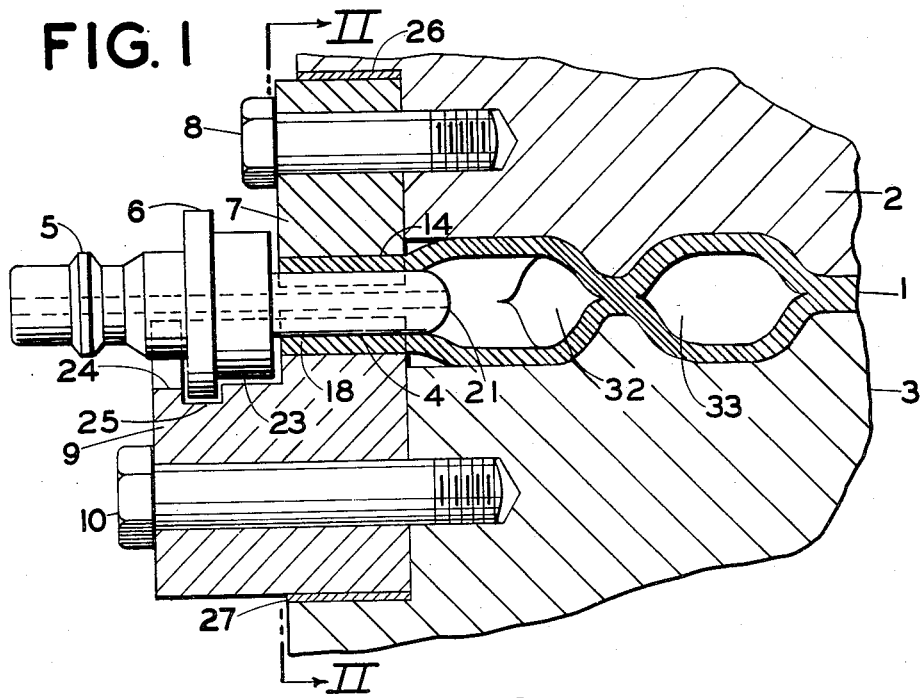
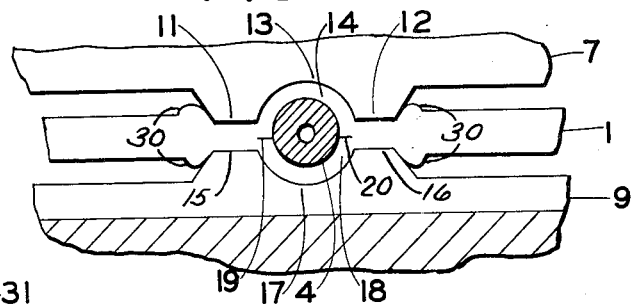
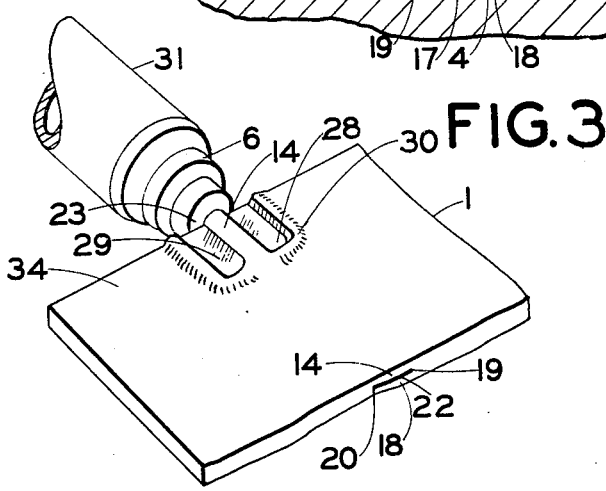
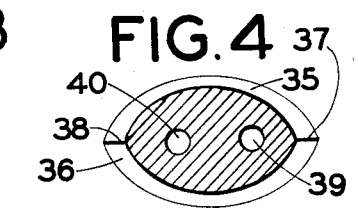
INVENTOR:
RICHARD F. ADAMS
BY
*John D. Wilkins*
ATTORNEY Aug. 23, 1960 R. F. ADAMS 2,949,875
APPARATUS FOR FORMING HOLLOW SHEET METAL PANELS
Filed July 22, 1954 2 Sheets-Sheet 2
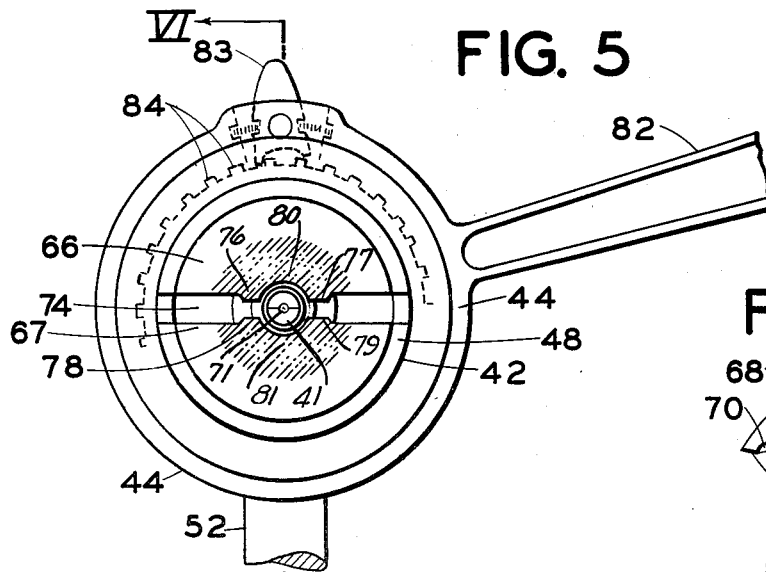
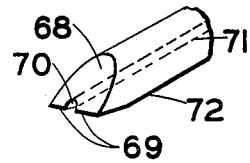
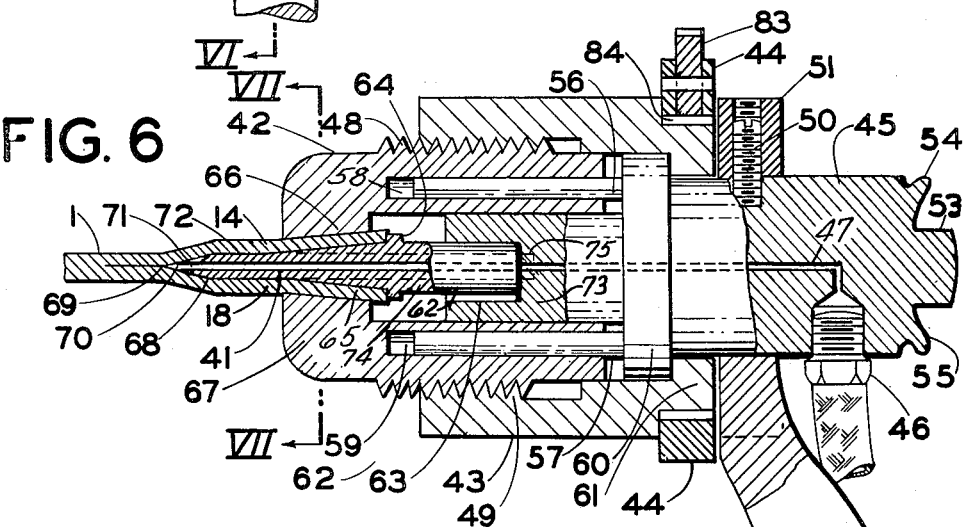
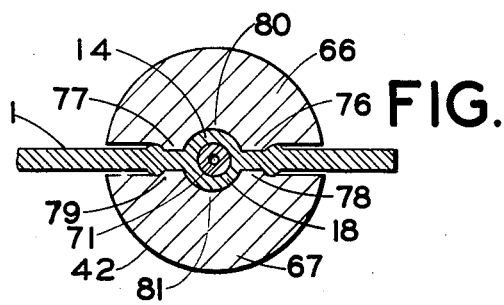
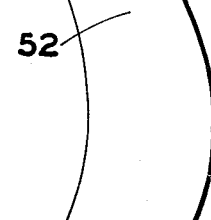
INVENTOR:
RICHARD F. ADAMS
BY John D. Wilkins
ATTORNEY United States Patent Office 2,949,875
Patented Aug. 23, 1960

2,949,875

APPARATUS FOR FORMING HOLLOW SHEET METAL PANELS

Richard F. Adams, Alton, Ill., assignor to Olin Mathieson Chemical Corporation, a corporation of Virginia Filed July 22, 1954, Ser. No. 445,108

20 Claims. (Cl. 113—44)

This invention relates to a pressure fitting or connection and more specifically to a fluid pressure injection device for inflation of hollow articles.

In the fabrication of hollow articles from sheeting by a method such as the pressure welding method, it is necessary to communicate fluid pressure to the interior surfaces of the embryonic fluid passageways in order to develop the passageways in accordance with a desired layout as predetermined by the presence of a thin layer of separation material, also referred to as "stop weld," between these surfaces. It is frequently desirable that such connection or fitting be adaptable for association with the sheet metal units only during the initial manufacturing operations including inflation and be removable before further fabrication.

In the prior art methods of forcing hollow metal articles to shape by fluid pressure, various fittings have been employed. According to one scheme, threaded fittings are formed or attached in some manner to the structure to be inflated (U.S. Patent Nos. 1,709,864, Muffly; 1,712,085, Litle; and 2,493,135, Gruetjen). The obvious disadvantage of these is that the addition of such fittings involves a hole punching or a breech forming process, brazing or welding operation together with a threading operation, all of which are costly and time consuming operations. Other devices used for the purpose are rather complex and require the formation of a flange on the article (U.S. 1,925,854, Squires; 2,047,296, Squires; and 2,221,539, Gehret) which is rather impractical with sheet material of relatively thin gage and obviously uneconomical for mass production of sheet metal items for the consumer market. A further illustration of these prior complex devices is U.S. 2,350,541 (Stulen) which, while suitable for large costly items such as an aeroplane propeller blade, would upon reduction to a scale for the purposes of this invention become an assembly of costly small precision parts not adaptable to the sheet metal operation to which this invention relates and difficult to keep in operating condition. Furthermore, none of the foregoing prior devices is capable of either prying open the edge of the sheet at the linearily exposed stop weld or is capable of being connected and further enlarging the opening by insertion and hence each is suitable for use only with a forged or machined end fitting.

Merely applying a pointed tool to the parting line of stop weld appearing at the edge of a sheet to make a tubular entrance and then forcing into the opening a piece of tubing for applying pressure to the sheet and it afterward to remain as an inlet or outlet for a heat exchange unit or the like is not satisfactory. Such a scheme necessitates that the sheet be extremely thick walled so that pressing the tube in will not tear the sheet and still enable the fitting to withstand pressure of up to 10,000 pounds per square inch or higher. This places a limitation on the thinness of gage with which the aforementioned pressure welding method may be practiced. Another disadvantage is that the presence of permanent fittings of this type interferes with the stacking, handling, packing, and shipping of the inflated pressure welded sheets which may be otherwise planar and capable of being handled just about like ordinary flat sheet.

Therefore, one object of this invention is to provide a method and apparatus for expanding such hollow articles without resort to permanent connections or the special metal forming operations at the proposed inlet as is necessary with prior art devices. Another object is to provide a mechanism readily applied to and separable from the edge of a hollow sheet metal article in sealing relationship with the fluid pressure inlet at such edge. Still another object is to provide a new and improved apparatus adapted for quickly forming a hermetically sealed connection to the undeveloped interior of a pressure welded sheet metal blank and, if desired, for providing a connection to the developed cavity of such a sheet metal unit for further fabricating operations. Other objects and advantages will be apparent from the description and accompanying drawing relating to various preferred embodiments of the invention.

In accordance with this invention, in general terms, a fluid pressure admitting member is provided and is inserted between the sheet material portions or labia surrounding the inlet lamination exposed at the edge of a sheet unit and the labia are compressed about the fluid pressure admitting member and against each other immediately adjacent said member by a clamping member. The pressure admitting member, formed preferably of stainless steel, consists of an inflation needle or cannula at one end and a high pressure coupling at the other end for connection to a source of fluid. Intermediate the needle and the coupling this member is provided preferably with an exterior flange which may be provided with flats or a knurl or the like to permit grasping and in some instances even turning the member which facilitates its removal after the pressure admitting member has served its purpose. The inflation needle is a tubular member which may be either circular, oval, or lenticular in cross section, and the forward end of it is at least rounded to facilitate insertion between the partially separated labia of the edge opening. The forward end of the needle in its preferred form may be provided with either a chisel-shaped point or a conical point to enable its being inserted to bring about initial separation of the labia. The external member takes the form of a clamping device capable of swaging the labia tightly about the needle and for closing up any gap which may occur at the corners of the labia and which would permit a leak between the exterior of the needle and the interior of the labia. The parts of the clamping member may be borne either by the press platens between which the hollow sheet unit is inflated or by an implement or tool also carrying the fluid pressure admitting member.

The general nature and extent of the invention will be better understood from a description of the several specific embodiments illustrated in the accompanying drawing in which:

Figure 1 is a side elevational view partially in cross section showing part of a heat exchange unit undergoing inflation in accordance with an embodiment of this invention;

Figure 2 is an elevational partial view taken on line II—II of Figure 1;

Figure 3 is a perspective fragmentary view showing a fitting associated in accordance with this invention with a pressure welded sheet metal unit such as a refrigerator evaporator prior to inflation;

Figure 4 is a cross sectional view showing a modification of the needle device of Figures 1 and 2;

Figure 5 is an elevational partial view of a device in accordance with another embodiment of the invention;

Figure 6 is a side cross sectional view taken on line

VI—VI of the device of Figure 5 into which a sheet metal unit has been inserted in accordance with this invention;

Figure 7 is a cross sectional view taken on line VII—VII of Figure 6 the better to illustrate the structural details; and Figure 8 is a perspective view of the front end of the needle shown in Figures 5, 6 and 7.

In Figures 1 and 2, a pressure welded sheet 1 is shown inflated between press platens 2 and 3 with a fluid pressure communication device in accordance with one embodiment of this invention. The pressure admitting member consists of circular tubular needle 4 with a rounded end 21 and a bore which is in communication with the bore of a coupling 5 such as a Hanson fitting or the like, suitable for connection with a source of high pressure fluid. The enlarged midsection between the needle 4 and coupling 5 is preferably provided with an exterior flange 6 which is serviceable not only as a grasping and turning means but also as a positioning means. The exterior clamping member is a two part clamp consisting of an upper jaw 7 supported on upper platen 2 with the aid of fastening means such as bolts 8 and a lower jaw 9 supported on lower platen 3 with the aid of any suitable fastening means such as bolts 10. The lower jaw 9 is preferably provided with an arcuate seat 24 having an arcuate groove 25 for reception of the flange 6. Desired positioning of jaw 7 and 9 is accomplished with the aid of shims 26 and 27, respectively. As shown in Figure 2, the upper jaw 7 is provided with spaced pressure pads 11 and 12 intermediate which is the arcuate die surface 13 adapted to compress upper labium 14 of sheet 1 against needle 4 with slight plastic deformation. Similarly lower jaw 9 is provided with pressure pads 15 and 16 intermediate which is disposed arcuate die surface 17 adapted to compress lower labium 18 of sheet 1 with slight plastic deformation tightly against needle 4. Pressure pads 11, 12, 15 and 16 of generally rectangular shape and flat surfaced usually are adapted to compressively and plastically deform or swage the metal of the sheet 1 immediately adjacent the inserted needle 4 at the corners 19 and 20 of the labia 14 and 18 so as to accomplish a form fitting seal about the needle.

In operation, the inlet lamination 22 which presents itself as a line at edge 34 of the flat rolled sheet metal unit 1 is first located, as shown in one part of Figure 3, and the labia 14 and 18 are initially pried apart in any manner with any suitable instrumentality after which the rounded end 21 of needle 4 is presented to and inserted into the opening at lamination 22 until the edge of sheet 1 is abutted against the enlarged midsection of the pressure admitting member which acts as a stop 23. The entire unit 1 is next placed between the opened platens 2 and 3 of a press where the pressure admitting member, connected to a fluid pressure supply line 31 as shown in Figure 3, is positioned properly between the jaws 7 and 9 of the exterior clamping member by seating flange 6 in arcuate groove 25 in the lower jaw 9. The platens 2 and 3 of the press are then brought together to the desired closed spacing at which position jaws 7 and 9 have been articulated to their position of closest approach. In this position arcuate die surfaces 13 and 17 of jaws 7 and 9 respectively compress the labia 14 and 18, which delineate lamination 22 of sheet 1, about the major circumferential portion of the exterior side wall of needle 4. In this position of the jaws, pressure pads 11 and 15 are brought into such close spacing as to deform the sheet 1 sufficiently to reduce the thickness of the metal noticeably at 28 immediately adjacent the needle 4 so as to close up the opening at corner 19 of the labia and to compress the metal at this corner firmly against needle 4. Similarly pressure pads 12 and 16 act on the metal at 29 to accomplish closure and compression at corner 20 of the labia 14 and 18. The deformation, evidenced by a bead 30 of deformed metal along the outer periphery of compressed areas 28 and 29, provides a hermetic seal. While thus secured between needle 4 and the die surfaces of jaws 7 and 9, the separated labia form a fluid pressure connection enabling inflation between platens 2 and 3 to erect fluid passageways such as 32 and 33 in the sheet metal unit 1.

In the form of inflation needle shown in Figure 4 the shape in cross section is lenticular and tapers down mostly laterally to a somewhat smaller cross section at the point which is preferably necked down and rounded but conical pointed, knife blade shaped, or chisel-shaped, i.e. has a point or linear edge, to facilitate entry between and even initial parting of the labia 14 and 18 at lamination 22 at edge 34. Convex upper face 35 of the needle operates on labium 14, for example, while lower face 36 operates on labium 18. Lateral edges 37 and 38 are adapted to the form of lamination 22 when opened at the corners 19 and 20. This form of needle may be advantageously provided with a dual bore consisting of passages 39 and 40 extending up toward the chisel point at the forward end but terminating short of the point in lateral outlets, preferably rearwardly extending and opening at the lateral edges 37 and 38 respectively at points forwardly of where the jaws 7 and 9 press upon the needle. The design of needle and its bend-back fluid passages minimizes the chances of scraping metal into the passages 39 and 40 to cause a closure. While the openings of these passages may be also disposed on surfaces 35 and 36, it is preferred that they be at edges 37 and 38 inasmuch as these are more tapered and are least pressed by the metal of sheet 1 at the lamination 22.

In the embodiment of Figures 5, 6 and 7, the pressure admitting member and the external compression member are constructed as parts of a single implement or mechanism, which includes a needle or cannula 41, an external compression applicator 42, a transmitter member or transmission sleeve 43, a compression operator 44 and a carrier and impact block 45 to one end of which the needle 41 is connected and near the other end of which there is attached any suitable high pressure coupling 46.

The carrier block 45, which is a piece of steel of generally cylindrical shape, is provided with a fluid passageway or bore 47 communicating with both the needle 41 and the coupling 46. Mounted on the carrier block 45 is the compression applicator 42 and the transmitter 43 the latter two of which are screw threadedly engaged at external threads 48 on applicator 42 and internal threads 49 on the transmitter 43. Fixed angularly about the carrier block by any suitable fastening means such as set screw 50 is a guide and support ring 51 from which there extends handle 52 which may take the form of a pistol grip by which the entire mechanism of this embodiment may be supported or grasped manually and manipulated as desired. The rear end or shank 53 of block 45 is adapted to be struck by a mallet, for example, or by an air hammer yieldably carried on lugs 54 and 55 integral with the carrier block 45 to drive needle 41 between the labia 14 and 18 of sheet metal unit 1 as shown in Figure 6. Also mounted on carrier block 45 are thin, forwardly extending pins 56 and 57 which slidably engage with holes 58 and 59 in the applicator and prevent rotational movement of the applicator 42 as sleeve 43 and its threads 48 are turned. The carrier annular protrusion 60 forms an abutment for the internal flange 61 of the sleeve 43 and takes the reaction force as the sleeve is turned down on applicator 42.

Needle 41 consists of circular shank 62 at the posterior with a suitable easily engageable and disengageable mechanical coupling such as spline 63 at one end and with a flange 64 near the other serving as a stop for the edge of the sheet metal unit 1, as shown in Figure 6. Ahead of the shank 62, the needle 41 has a tapering conical portion 65 designed for coaction with jaws 66 and 67 of compression applicator 42. At the front end, the needle terminates in a conoidal pointed shape 68 with a chisel edge 69 at which there is an opening 70 set back from and bisecting the edge 69. Opening 70 is in communication with the bore 71 of the needle. Between the point shape 68 and the conical portion 65 is a circular tubular extension 72 of the needle the purpose of which is to position the point 68 and its opening sufficiently ahead of the jaws 66 and 67 so as to make the point readily visible and easy to apply to the edge of sheet unit 1 to spread apart the labia 14 and 18 while the jaws 66 and 67 are in the forward open position and so as to place the opening 70 ahead of the jaws 66 and 67 during the compression operation which would otherwise seal the opening.

Mounted slidably on the forward cylindrical portion 73 and pins 56 and 57 of the carrier block is the compression applicator 42 which takes the form of a cup-like or hollow cylinder the "front" of which at jaws 66 and 67 is solid except for the slot 74 intermediate the jaws and which terminates at 75 short of the "open" rear end of the cylindrical body of the applicator 42 which is thus nearly bisected by the slot. The applicator is provided with external threads 48 engageable with the internal threads 49 of the sleeve 43. Where desired, threads 48 and 49 may be tapered pitch threads to accentuate the clamping action obtainable. The hollow cylindrical body of the applicator 42 is so formed as to be somewhat sprung open at the front end of the slot 74 so that compression applicator jaws 66 and 67 are spaced apart yieldably a greater distance when the threads 48 and 49 are in but minor or no engagement. As the threads are screwed into greater engagement the distance between the jaws 66 and 67 at slot 74 is reduced. Upper jaw 66 is provided at the slot 74 with pressure pads 76 and 77 and the lower jaw 67 is provided at the slot 74 with pressure pads 78 and 79. Between pads 76 and 77, the upper jaw 66 is provided with an arcuate die surface 80 which is part of a cone larger than the conical portion 65 of the needle 41 by an amount slightly less than the thickness of the labium 14. Between pads 78 and 79, the lower jaw 67 is provided with an arcuate die surface 81 which is part of the same cone as the die surface 80 of the upper jaw 66.

Sleeve 43 is rotatably mounted on carrier block 45 and engages at its internal threads 49 with the threads 48 of the applicator 42 so as to impart longitudinal movement to the applicator as sleeve 43 is turned by the compression operator 44 which takes the form of a rotatable ring from which there extends a handle 82. The compression operator ring 44 is mounted rotatably on the sleeve 43 and engages by means of the flip-flop pawl 83 with it at the ratchet teeth 84 carried externally about the sleeve 43. Operator ring 44 is rotatably confined on sleeve 43 by support ring 51 which together with protrusion 60 constrains sleeve 43 at flange 61 longitudinally while permitting rotational movement of both sleeve 43 and operator ring 44.

The form of the needle point 68, more clearly illustrated in Figure 8, is advantageous in that the opening 70 is set back from the bisected edge 69 and hence will not tend to pick up particles of metal or to become shut as edge 69 pries open the labia 14 and 18 of sheet 1.

In operation, the device of this embodiment while grasped or supported at grip 52 is manipulated so as to present edge 69 of the separable needle 41 to the edge of sheet unit 1 in proper position for prying open the labia 14 and 18. When so positioned, hammer blows are struck upon shank 53 of the carrier block 45 either manually or by means of an air hammer attached at lugs 54 and 55 to drive needle 41 between the labia until the edge portion of sheet unit 1 has passed into slot 74 between jaws 66 and 67 sufficiently to seat the labia 14 and 18 against flange 64 on the needle 41. Next, with the pawl 83 properly set for screw-down operation, the handle 82 is oscillated manually or otherwise to put pawl 83 carried on compression operator ring 44 into one-way positive engagement with the ratchet teeth 84 on transmission sleeve 43, thereby turning the sleeve 43 to screw-down the compression applicator 42. This operation, which brings the jaws 66 and 67 closer together and also toward the conical portion 65 of the needle 41, results in seizure and swaging of labia 14 and 18 between the needle 41 and the jaws 66 and 67 which is shown in Figure 7.

When the jaws are positioned as shown in Figure 7, at which position pressure pads 76 and 77 and arcuate die 80 of jaw 66 deform the metal of sheet unit 1 between them and pressure pads 78 and 79 and arcuate die 81 of jaw 67, fluid pressure is released to enter at coupling 46 and to be admitted into the interior of sheet metal unit 1 via the bores 47 and 71 of the block 45 and needle 41, respectively.

Upon completion of the inflation operation, after the fluid pressure is shut off, the jaws 66 and 67 are opened by throwing the flip-flop pawl 83 to engage with teeth 84 to accomplish unscrewing of applicator body 42 and sleeve 43 as handle 82 is again oscillated. Release of the coupling 63 permits the needle 41 to remain in sheet unit 1, if desired. Otherwise coupling 63 may be dispensed with and the entire device together with needle 41 is removable from the inflated sheet metal unit 1.

While the compression operator has been described as including the mechanical elements of a pawl, a ratchet and a screw threaded transmission sleeve it is to be understood that this preferred embodiment is only illustrative of the inventive principle involved and that the compression clamp operating means may be a pneumatic or hydraulic cylinder actuated possibly by the inflation medium. It is evident to those skilled in the art that this embodiment is amendable to inclusion of a fluid pressure valve operated by a trigger located in the pistol grip 52 which would initiate not only a fluid pressure actuated clamping pressure applicator but also feed fluid pressure for inflation to the needle 41.

By means of this invention there is obtained not only a hermetic seal during the step of fluid pressure inflation of a sheet metal unit having an internal pattern of lamina but also the provision of a connection that may be retained with the sheet after inflation to aid in other manufacturing operations such as the washing and the drying of the interior walls of the passageways, after which the connection is readily removable.

It will also be evident to those skilled in the art that this invention has utility in connection with inflation of articles made from sheet material by methods other than pressure welding wherein an interposed stop weld material is employed.

Since many other embodiments of this invention may occur to those skilled in the art, it is to be understood the foregoing is intended by way of illustration of a preferred embodiment and not as a limitation of the scope of the present invention except as set forth in the appended claims.

What I claim is:

1. A device for communicating fluid pressure to the interior of a sheet metal unit partially laminated in accordance with a predetermined final passageway design including an inlet, comprising interior means detachably securable to said unit in fixed relationship with respect thereto, said means consisting of needle and driving portions, said driving portion being adapted for inserting said needle portion into the unit at said inlet in said fixed position for holding apart the sheet metal portions with desired configuration and for admitting a fluid under pressure into said sheet metal unit at said inlet, and pair of spaced diametrically opposed exterior means axially and transversely aligned with each other and maintained in alignment with said interior means for pressing only adjacent sheet metal firmly about said needle portion while leaving the rest of the sheet metal unit substantially free from said clamping pressure to secure said means to said unit and prevent leakage of said fluid.

2. A device for communicating fluid pressure to the interior of a sheet metal unit partially laminated in accordance with a desired passageway design including an exposed inlet lamination defined by opposed sheet metal labia comprising a tubular needle for holding apart the sheet metal labia on opposite side of said inlet lamination and for admitting a fluid under pressure into the lamina of said sheet metal unit, a pair of spaced clamping jaws operatively connected to said needle, said jaw being provided with a recess in alignment with said needle and adapted for coaction therewith to conform said labia about said needle by pressing and plastically forming said separated labia and the metal immediately adjacent thereto against said needle inserted between said labia while leaving the rest of the unit of the said unit substantially undistorted, and means for actuating said jaws operatively connected thereto for opening and closing said jaws, said needle having a portion thereon adapted for receiving a driving force for driving said needle into said inlet lamination.

3. A device for communicating fluid pressure to the interior of a sheet metal unit partially laminated in accordance with a desired passageway design including an exposed inlet lamination defined by opposed sheet metal labia comprising a tubular needle of circular cross-section for holding apart the sheet metal labia on opposite sides of said inlet lamination and for admitting a fluid under pressure into the lamina of said unit, said needle having a point of a shape adapted for enabling the needle to be readily inserted into said lamination and having a portion thereon adapted for receiving a driving force for driving said needle into said inlet lamination, a pair of spaced diametrically opposed clamping jaws operatively connected to said needle, said jaws being provided with a recess in alignment with said needle and adapted for coaction therewith to conform said labia about said needle by pressing and plastically deforming said separated sheet metal labia and the metal immediately adjacent thereto against said needle inserted between said labia while leaving the rest of the sheet metal unit substantially undistorted, and means for actuating said jaws operatively connected thereto for opening and closing said jaws.

4. A device for communicating fluid pressure to the interior of a sheet metal unit partially laminated in accordance with a desired passageway design including an exposed inlet lamination defined by opposed sheet metal labia comprising, a tubular needle of circular cross-section with a rounded point for holding apart the sheet metal labia on opposite sides of said inlet lamination and for admitting a fluid under pressure into the lamina of said unit, a pair of spaced diametrically opposed jaws spaced from and operatively connected to said needle, said jaws being provided with a recess in alignment with said needle and adapted for coaction therewith to conform said labia about said needle by pressing and plastically deforming said separated sheet metal labia and the metal immediately adjacent thereto against said needle inserted between said labia while leaving the rest of the unit substantially undistorted, each of said jaws having recessed arcuate die surfaces maintained in alignment with each other and said needle for coaction therewith and having on opposite lateral sides of each recess a pressure pad for coaction with corresponding pads of the other for swaging the metal of said unit immediately adjacent of said needle with maximum severity, and means for actuating said jaws operatively connected thereto for opening and closing said jaws.

5. A device for communicating fluid pressure to the interior of a sheet metal unit partially laminated in accordance with a desired passageway design including an exposed inlet lamination defined by opposed sheet metal labia comprising, a tubular needle of circular cross-section with a rounded point for holding apart the said labia on opposite sides of said inlet lamination and for admitting a fluid under pressure into the lamina of said unit, a pair of diametrically opposed jaws spaced from and operatively connected to said needle, said jaws being provided with an arcuate recess in the alignment with said needle and adapted for coaction therewith to conform said labia about said needle by pressing and plastically deforming said separated labia and the metal immediately adjacent thereto against said needle inserted between said labia while leaving the rest of said sheet metal unit substantially undistorted, said jaws having an arcuate recessed die surface in alignment with said needle for coaction therewith and having on opposite sides of said arcuate recess extended pressure pads for swaging the metal of said unit adjacent of said labia, and means for actuating said jaws operatively connected thereto for operating and closing said jaws.

6. The device of claim 2 wherein the needle is of oval cross-section.

7. A device for communicating fluid pressure to the interior of a sheet metal unit partially laminated in accordance with a desired passageway design including an exposed inlet lamination defined by opposed sheet metal labia comprising, a tubular needle of lenticular cross-section for holding apart the sheet metal labia on opposite sides of said inlet lamination for admitting a fluid under pressure into the lamina of said sheet metal unit, clamping jaws, means for operatively connecting said jaws to said needle, said jaws being provided with a recess in alignment with said needle and adapted for coaction therewith to conform said labia about said needle by pressing and plastically deforming said separated sheet metal labia and the metal immediately adjacent thereto against said needle inserted within said inlet lamination while leaving the rest of the sheet metal unit substantially undistorted, said needle having lateral edges tapering so as to bring the apices of the lenticular cross-section closer together at the front end of said needle which is formed to a chisel edge and also having dual fluid pressure passageways opening laterally adjacent the chisel edge, and actuating means for said jaws operatively connected thereto for opening and closing said jaws.

8. The device of claim 3 wherein at least a portion of the needle of circular cross-section tapers intermediate the point and rear end portion to a lesser cross-section toward the point.

9. A device for communicating fluid pressure to the interior of a sheet metal unit partially laminated in accordance with a desired passageway design including an exposed inlet lamination defined by opposed sheet metal labia comprising, a tubular needle of circular cross-section for holding apart the sheet metal labia on opposite sides of said inlet lamination and for admitting a fluid under pressure into the lamina of said sheet metal unit, said needle terminating at the front in a conoidal portion the anterior of which is in the form of a chisel edge bisected by the open end of the coaxial fluid pressure passageway in the needle, said opening being set back from the chisel edge, diametrically opposed clamping jaws operatively connected to said needle, said jaws being provided with a recess in alignment with said needle and adapted for coaction therewith to conform said labia about said needle by pressing and plastically deforming said separated sheet metal labia and the metal immediately adjacent thereto against said needle inserted within said inlet lamination while leaving the rest of the sheet metal unit substantially undeformed, and means for actuating said jaws operatively connected thereto for opening and closing said jaws.

10. The device of claim 1 wherein the needle portion is of lenticular transverse cross section.

11. A device for communicating fluid pressure to the interior of a sheet metal unit partially laminated in accordance with a desired passageway design including an inlet lamination extending to an edge of said sheet metal unit and defined by opposed sheet metal labia comprising a support; a carrier block mounted on said support and having a fluid passageway therethrough; a cannula mounted on the front end of said block and coupled with said fluid passageway for holding apart said labia on opposite sides of said inlet lamination and for admitting inflation fluid under pressure into the lamina of said sheet metal unit, said cannula having a point constructed to permit the cannula to be readily inserted adjacent the mid-section of said inlet lamination between the corners of said labia for separating the labia and including a fluid discharge opening surrounded by said point, and exterior clamp means mounted on said carrier block and including spaced diametrically opposed members movable toward and away from said cannula and adapted for receiving between them the edge portion of said sheet metal unit at said inlet lamination and said cannula for applying oppositely directed compression forces externally of said labia toward said cannula whereby said sheet metal about said inlet lamination is plastically deformed to conform said labia snugly about said cannula.

12. The device of preceding claim 11 wherein the cannula is disengageably mounted on the front end of said block and disengageably coupled with said fluid passageway.

13. The device of preceding claim 11 wherein the cannula has an enlarged rear end portion extending outwardly beyond the front portion of the cannula, said rear end portion being adapted for seating on the front end of the block to center the cannula with respect to said diametrically opposed members of the clamp means and having a shoulder for positioning the cannula with respect to said edge of the sheet, said rear end portion being adapted to be mounted disengageably on said carrier block and disengageably coupled with said fluid passageway.

14. A device in accordance with preceding claim 11 wherein said carrier block includes means for accepting a forwardly directed impact blow for the purpose of driving said cannula between said labia.

15. A device in accordance with preceding claim 11 wherein the clamp means is fluid pressure operated.

16. A device in accordance with preceding claim 11 wherein impact is provided by a fluid pressure operated means.

17. The device of preceding claim 11 wherein the clamp means is fluid pressure operated and wherein the impact is provided by a fluid pressure operated means.

18. The device of claim 11 wherein the cannula includes a conical portion tapered down toward the point and said clamp means consists of an externally threaded compression member the front end of which is diametrically slotted and carries conical die members coaxially arranged about the cannula for coaction with the conical portion of the cannula, said member being slidably mounted on the carrier and constrained against rotation and an internally threaded rotatable sleeve screw threadedly engaging said compression member for converting the rotational motion of said sleeve to longitudinal translation of said compression member and its die members with respect to said conical portion of the cannula whereby the spacing between said conical portions of the cannula and the die members may be varied to clamp and plastically deform and to subsequently release the sheet metal in the region of said labia, and means for imparting rotational motion to said sleeve member in one direction to form a hermetically sealed connection of said cannula with said inlet lamination and for imparting rotational motion to said sleeve member in the opposite direction to disengage said clamp means from said sheet metal.

19. A device for communicating fluid pressure to the interior of a sheet unit partially laminated in accordance with a desired passageway design including an exposed inlet lamination defined by opposed sheet labia, comprising hollow interior means for holding apart the said sheet labia on opposite sides of said inlet lamination and for admitting fluid under pressure into the lamina of said sheet unit, and exterior means operatively connected to said interior means, said exterior means being bifucated for reception of a portion of said unit containing said inlet lamination and having adjustable opposed moveable members, complementary recesses in each of said members intermediate the ends thereof for coaction with the interior means for passing and plastically deforming said separated sheet labia and portions of said sheet unit immediately adjacent thereto between said members to conform said labia firmly against said interior means to prevent leakage of said fluid between said interior means and said labia while leaving the rest of the sheet unit substantially undistorted, and actuating means for said members operatively connected to said exterior means for opening and closing said members.

20. A device for communicating fluid pressure to the interior of a sheet metal unit partially laminated in accordance with a desired passageway designed including an exposed inlet lamination defined by opposed sheet metal labia comprising a tubular needle having a point of a shape adapted for enabling the needle to be readily inserted into said inlet lamination for holding apart said sheet metal labia on opposite sides thereof and for admitting a fluid under pressure into the lamina of said sheet metal unit, spaced diametrically opposed clamping jaws, said jaws being provided with a recess in alignment with said needle and adapted for coaction therewith to conform said labia about said needle by pressing said separated sheet metal labia and the metal immediately adjacent thereto against said needle inserted within said inlet lamination with sufficient pressure to deform the metal at least at the corners of said labia and hermetically seal said unit with respect to said needle leaving the rest of the sheet metal unit substantially undistorted, a first alignment means on at least one of said jaws, a second alignment means on said needle for engagement which said first alignment means in cooperating relationship with each other for aligning the front part of said needle at said clamping jaws, and actuating means for said jaws operatively connected thereto for opening and closing said jaws.

References Cited in the file of this patent

UNITED STATES PATENTS

| | | |
|---|---|---|
| 464,736 | Stapley | Dec. 8, 1891 |
| 765,827 | Felker | July 26, 1904 |
| 1,052,193 | Vogt | Feb. 4, 1913 |
| 1,522,051 | Fulton | Jan. 6, 1925 |
| 2,350,541 | Stulen | June 6, 1944 |
| 2,662,273 | Long | Dec. 15, 1953 |
| 2,756,487 | Heidorn | July 31, 1956 |
| 2,779,086 | Rieppel et al. | Jan. 29, 1957 |
| 2,882,588 | Rieppel | Apr. 21, 1959 |

FOREIGN PATENTS

| | | |
|---|---|---|
| 523,948 | Great Britain | July 25, 1940 |
| 106,492 | Sweden | Apr. 20, 1943 |
| 695,640 | Great Britain | Aug. 12, 1953 |

UNITED STATES PATENT OFFICE
CERTIFICATE OF CORRECTION

Patent No. 2,949,875            August 23, 1960

Richard F. Adams

It is hereby certified that error appears in the printed specification of the above numbered patent requiring correction and that the said Letters Patent should read as corrected below.

Column 1, line 34, for the patent number "1,709,864" read -- 1,709,865 --; column 10, line 18, for "passing" read -- pressing --.

Signed and sealed this 25th day of April 1961.

(SEAL)
Attest:

ERNEST W. SWIDER            DAVID L. LADD

Attesting Officer            Commissioner of Patents